United States Patent [19]

Lim et al.

[11] Patent Number: 4,722,141

[45] Date of Patent: Feb. 2, 1988

[54] CHAIN SAW CUTTER BAR-NOSE ASSEMBLY

[75] Inventors: Hui C. Lim; Dennis G. Scott-Jackson, both of Burnaby, Canada

[73] Assignee: Windsor Machine Co., Limited, Burnaby, Canada

[21] Appl. No.: 772,142

[22] Filed: Sep. 3, 1985

[30] Foreign Application Priority Data

Apr. 23, 1985 [CA] Canada .................................. 479885

[51] Int. Cl.[4] ............................................... B23D 57/02

[52] U.S. Cl. ........................................ 30/384; 30/381; 30/383; 30/387

[58] Field of Search ................. 30/381, 382, 383, 384, 30/387; 83/824, 825

[56] References Cited

U.S. PATENT DOCUMENTS

| | | | |
|---|---|---|---|
| 2,316,997 | 4/1943 | Smith | 30/384 |
| 3,762,047 | 10/1973 | Scott-Jackson | 30/385 |
| 3,955,279 | 5/1976 | Pierson | 30/384 |
| 3,987,544 | 10/1976 | Gibson | 30/384 |
| 4,021,913 | 5/1977 | Artt | 30/384 |
| 4,060,895 | 12/1977 | Hille | 30/384 |
| 4,259,783 | 4/1981 | Scott-Jackson et al. | 30/384 |
| 4,489,493 | 12/1984 | Tsumura | 30/387 |

*Primary Examiner*—E. R. Kazenske
*Assistant Examiner*—Willmon Fridie, Jr.
*Attorney, Agent, or Firm*—Burns, Doane, Swecker & Mathis

[57] ABSTRACT

A chain saw bar having an elongated shape, a saw chain guideway around substantially the length of the perimeter thereof, with a matching saw chain sprocket in the nose thereof, and calculated points of variation in strength in the interior of the bar at points removed from the sprocket, the points of variation in strength acting so that if the bar is subjected to an excessive bending force, the bar will tend to become bent initially at one point of variation in strength and with increased bending force at a subsequent point of variation in strength. In this way, extreme bending of the bar at one location and pinching of the sprocket are minimized.

7 Claims, 14 Drawing Figures

CHAIN SAW CUTTER BAR-NOSE ASSEMBLY

FIELD OF THE INVENTION

This invention relates to a novel chain saw bar and nose piece construction. More particularly, this invention relates to a novel chain saw bar-nose piece combination which has reduced susceptibility to permanent damage when the bar is accidentally bent or distorted due to exposure to undue or excessive stresses and forces in the field.

BACKGROUND OF THE INVENTION

In certain rigorous workplace environments and situations, it has been found that chain saw cutter bar-detachable nose constructions available on the market are prone to bending, distortion and even permanent damage. This can occur in a tree falling accident, or when a cut tree sets back on the saw bar, or when the chain saw bucks excessively or is subjected to extremely rough handling. The chain saw cutter bar-detachable nose design disclosed in U.S. Pat. No. 3,762,047, Dennis G. Scott-Jackson, Oct. 2, 1973, represented an important and valuable advance in the chain saw art and because of this, it has over the years received broad world-wide acceptance and commercial success. However, to discuss the Scott-Jackson design in particular, although it is not the only design which is susceptible to bending, it has been found that the cutter bar can become bent along a line extending laterally across the bar at the point where the extensions extend from the bar body to support and engage with the end sprocket. The bend between the bar and the nose tends to cause a pinch to the rear side of the sprocket located within the nose. This can cause heat due to friction, softening of the sprocket and possibly breakage of the sprocket, nose or bar. In another instance, particularly where the chain saw and cutter bar are subjected to very rough treatment or tough cutting jobs, or where bending at the nose extensions takes place, the extensions of the bar can become slightly spread. In extreme cases, one or more of the bar extensions may become permanently bent or even break off. Thus, the bar must be replaced.

Other chain saw cutter bar-nose designs currently available on the marketplace are also prone to bending problems, some more serious than the Scott-Jackson design.

The applicant is aware of the following references which may have some relevance to the applicant's novel bar-nose design:

| U.S. Pat. No. | Issue Date | Inventor |
|---|---|---|
| 2,316,997 | April 20, 1943 | Smith |
| 3,762,047 | October 2, 1973 | Scott-Jackson |
| 3,955,279 | May 11, 1976 | Pierson |
| 3,987,544 | October 26, 1976 | Gibson |
| 4,021,913 | May 10, 1977 | Arff |
| 4,060,895 | December 6, 1977 | Hille |
| 4,259,783 | April 7, 1981 | Scott-Jackson et al. |
| 4,489,493 | December 25, 1984 | Tsumura |

These references illustrate various designs and constructions of internal cutter bar-spacer plate assemblies. Many of the designs are prone to bending problems. None discloses or teaches the applicant's invention whereby calculated points of varying strength are custom built into the cutter bar-nose bar assembly to thereby encourage bending at certain preferential locations. This action reduces pinching of the sprocket in the nose of the cutter bar-nose assembly. The references also do not disclose the utilization of a solid web between the nose extensions to prevent lateral spreading of the extensions of the bar on either side of the nose extensions.

SUMMARY OF THE INVENTION

The invention is directed to an improved design of chain saw bar which has an elongated shape with a saw chain guideway around substantially the length of the perimeter thereof and a saw chain saw sprocket in the nose thereof. The improvement comprises constructing in the interior of the bar at points removed from the sprocket calculated points of variation in strength. Thus if the nose or the bar is subjected to severe bending stresses or forces, the bar will tend to become bent initially at one of the points of variation in strength and with increased bending force at a subsequent point of variation in strength. Accordingly, the bar or nose will reduce the tendency to pinch the sprocket or become bent in the region of the sprocket.

In the novel saw bar, the points of variation in strength may be caused by a void in the interior of the bar. The void may be created by a hollow in the interior of the bar which communicates with the hollow within which the sprocket is positioned. A plate may be positioned within the hollow adjacent the sprocket and cause points of variation in strength to exist on either side of the plate. The plate may be curved in a concave manner on the side adjacent to the sprocket to accomodate the circumferential path traced by the ends of the teeth of the sprocket. The plate may also be curved on the side opposite the sprocket facing side of the plate. The curve of the plate on the side opposite the sprocket facing side may be convex.

A saw bar may be constructed of two main components, one component comprising the main bar body, the other component comprising the nose piece holding the sprocket in the interior thereof, the two components being detachable from one another, the extensions extending into and engaging with two corresponding matching recesses formed in the main bar body at the end of the bar proximate to the nose piece. A web may exist between the two recesses in the main bar body and extend across the width of the two recesses.

The novel chain saw bar-nose assembly may comprise: (a) a pair of facing side plates with an extension extending from each side plate; (b) an elongated bar with a saw chain raceway around at least part of the perimeter thereof, means for engaging a chain saw motor and drive at one end thereof, and a pair of receptacles at the opposite end of the bar on each side thereof adapted to receive the respective extensions extending from the pair of side plates; (c) a saw chain sprocket positioned between the two side plates at the end opposite the two extensions; (d) means for enabling the sprocket to be secured between and rotated within the two facing side plates; (e) a centre plate positioned between the two facing side plates and between the sprocket and the extensions; and (f) a web of same thickness as the centre plate located between the two receptacles on each side of the bar.

In the chain saw bar-nose assembly, the extension may be of a width less than the main body portion of the side plate. The end of the extension removed from the main body portion may be of rounded shape. The shape of the two receptacles in the bar may be congruent with the shape of the extensions of the pair of side plates.

In construction, the centre plate may be of a generally crescent shape with the concave side thereof facing the circular edge of the sprocket and the convex side thereof facing the web of the bar. The edge of the web facing the convex side of the centre plate may be concave while the radius thereof has the same pivot point as the radius of curvature of the convex side of the centre plate. The bar, the sprocket, and the centre plate may be secured together by a plurality of spatially arranged rivets.

DRAWINGS

In the drawings which illustrate in detail the prior art and a specific embodiment of the invention:

FIG. 1 illustrates in perspective view a bar nose and cutter bar of the design originally disclosed and claimed in Scott-Jackson, U.S. Pat. No. 3,762,047 bent (exaggerated) at one point of weakness removed from the sprocket;

FIG. 2 illustrates in exaggerated manner a side elevation view of a bar nose and cutter bar assembly of the original Scott-Jackson design disclosed and claimed in U.S. Pat. No. 3,762,047, which has been bent at a point of weakness proximate to the sprocket;

DETAILED DESCRIPTION OF ONE EMBODIMENT OF THE INVENTION

Figure 1:
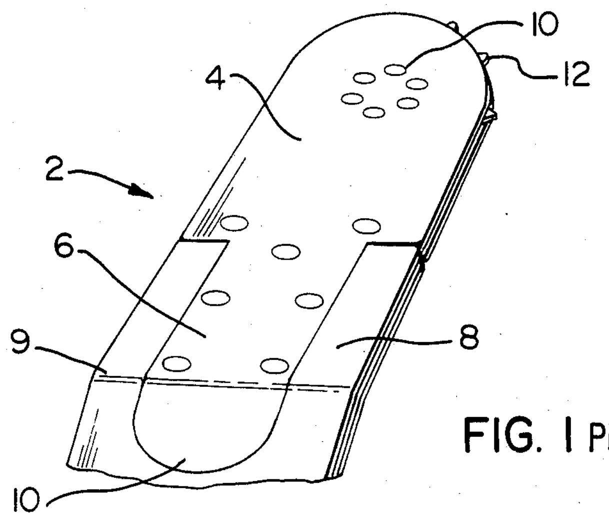
FIG. 1 PRIOR ART
Figure 2:
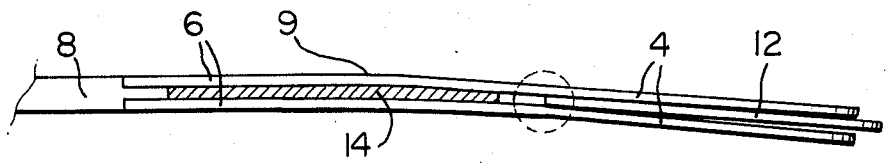
FIG. 2 PRIOR ART

Referring to the drawings, and for background purposes in understanding the novel concept and design of the subject invention, FIG. 1 illustrates in perspective view (in exaggerated form for illustrative purposes) a bar nose and cutter bar assembly 2 of the original Scott-Jackson construction as disclosed and claimed in U.S. Pat. No. 3,762,047, which has been bent at a point of weakness removed from the sprocket. FIG. 2 illustrates in partial side section view a bar nose and cutter bar assembly which has been bent at a point of weakness proximate to the sprocket. When a chain saw is used in the field in felling trees and cutting wood, it has been found that bending of the cutter bar is a relatively frequently occurring problem. The cutter bar can become bent either through hard or rough use, or in a tree falling accident, or when a tree is being felled by cutting a kerf through the tree, and the tree accidentally sets back on the bar, or bar nose. In the original Scott-Jackson bar nose-cutter bar assembly, it has been found that the bar-nose tends to bend at either of two points of weakness. As shown in FIG. 1, one point of weakness is in a direction laterally across the bar 8 at the point 9.

FIG. 2 illustrates in side elevation view (in somewhat exaggerated manner for illustrative purposes) a bent bar-nose assembly 2 of the Scott-Jackson design wherein two side plates 4 with respective extension connector sections 6 extend into receptacles built into the basic cutter bar 8. A spacer plate 14 is positioned and sandwiched between the two connector extensions 6. FIG. 2 illustrates the first point of weakness 9 across the cutter bar-nose assembly at a point proximate to the sprocket 12. It has also been found that when the nose assembly 2 is subjected to bending forces. At point 11, the two side plates 4 tend to spread in a manner as seen in FIG. 2. This type of bending at point 11 tends to squeeze the end of the sprocket 12 that is proximate to the spacer plate 14. Thus, if the bent cutter bar-nose assembly 2 continues to be used, the sprocket rubs against one or both of the "pinched" side plates 4. This develops heat due to friction, which in turn causes softening of the sprocket and even, in some instances, breakage of the assembly 2.

To reduce the risk of "pinching" and potential damage resulting from overheating, and to minimize bar and nose breakage as much as possible, the inventors have developed a novel concept. The concept is embodied in a combination of a solid web at the forward nose end of the bar, and a special spacer plate mounted in the interior of the bar and nose. The spacer plate is designed to provide a first point of variation in strength at its curved sprocket facing side and a second point of variation in strength at the lower curved edge at the end facing the bar. The sprocket facing curve corresponds with the curve of the ends of the sprocket teeth. This lower curve matches a similar curved edge at the nose facing edge of the solid web.

The concept of two points of variation in strength provides a graduated bending pattern whereby the first point of variation in strength bends on the application of an initial bending force thereby causing temporary elastic deformation only. If a greater bending force is exerted on the sprocket nose assembly, then bending or distortion of the nose assembly takes place at the second point of variation in strength. In this way, the sprocket-nose assembly bends at two locations and can absorb a larger bending force than is possible the Scott-Jackson construction, U.S. patent 3,762,047, before pinching of the sprocket takes place. A permanent bend may occur in the area of the second calculated point of variation in strength, but before damage to the sprocket occurs due to friction and overheating, the problem can be corrected in an inexpensive straightening operation, thereby permitting continued use of the bar and nose assembly.

The commensurate curves of the web and spacer plate at the second point of variation in strength are designed to carefully balance operational strength of the chain saw with calculated yield strength when the bar-nose assembly is subjected to excessive bending action. A larger radius curve results in an unduly and unacceptably weak bar-nose section. A smaller radius curve tends to have too much inherent strength and this tends to shift the likely point of bending in the direction of the nose and sprocket, thus thereby aggravating the sprocket pinching problem. The length of the pair of matching curves is sufficient to resist normal twisting and bending moments exerted on the bar-nose assembly under operating conditions.

The novel saw bar-nose construction is also directed to alleviating a secondary problem. To minimize or eliminate spreading of the extensions on either side of the nose extensions as in the existing Scott-Jackson design, the bar extensions are joined by a solid web under the nose plate extensions. The maximum web area is designed to provide sufficient overall strength to the bar-nose assembly as well as detering potential extension spreading forces.

The new bar-nose assembly also provides for a rearrangement of rivets which hold the nose in permanent position. The total number of rivet openings has been reduced, thereby reducing manufacturing costs. Also, the rivets have been respaced to reduce concentrations of stresses or forces in localized areas and thereby avoid cracking and/or failure of the bar or nose due to stress fatigue. The distribution of rivets and rivet openings with resultant even stress distribution provides for a strong nose and bar assembly. Other pitches of chain and sprockets use the same concept and general design to provide maximum strength and flexibility in manufacturing of the bar and nose components.

Figure 3:
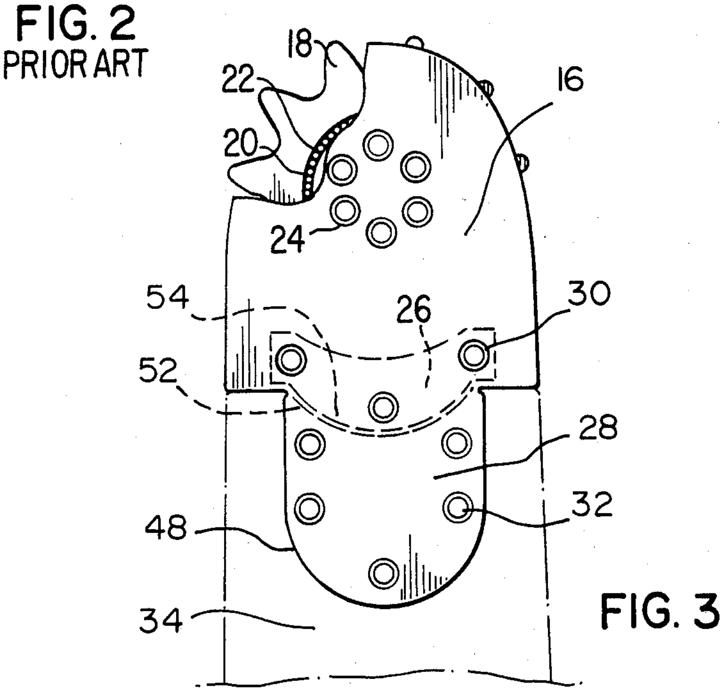
FIG. 3 illustrates a front elevation view (partially cut-away) of the novel bar nose-cutter bar construction of the present invention.

The novel bar-nose assembly designed to avoid some of the aforementioned problems is illustrated in the drawings identified as FIGS. 3 through 11. FIG. 3 represents a front elevation view (partially cut-away) of the bar-nose cutter bar assembly. FIG. 3 discloses the fundamental components of the novel bar-nose assembly of the invention. The nose is formed of a pair of matching facing side plates 16 which, as shown in FIG. 3, and by means of the cut-away portion, are positioned in front of and behind sprocket 18, thereby sandwiching or laminating the sprocket 18 between them. The bearing centre 20, and bearing rollers 22, which make up the sprocket combination can also be seen in FIG. 3. The sprocket 18, bearing centre 20, and bearing rollers 22, are held in place by six rivets 24. For ease of description, only one side plate 16 will be discussed. The side plate 16 is constructed so that it has a connector extension 28, which is of a design similar to the nose plate design shown in the original Scott-Jackson design in U.S. Pat. No. 3,762,047. The connector extension 28 is shaped so that it is congruent with and fits in the receptacle 48 which is machined in the forward end of cutter bar 34. The connector 28 is secured to the cutter bar 34 by means of five rivets 32. These rivets are disposed so as to spread the stresses and bending forces evenly throughout the connector extension 28 and the cutter bar 34.

Figure 5:
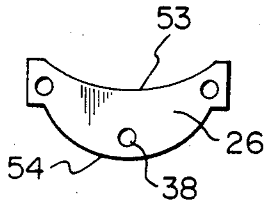
FIG. 5 illustrates a front elevation view of the novel centre plate with rivet holes and calculated curved bar facing edge.

As seen in FIGS. 3 and 5, a centre plate 26 is located behind side plate 16. Centre plate 26 is held in place by means of three centre plate rivets 30. Centre plate 26 is designed so that it has a generally overall crescent shape, with a lower curved edge, which corresponds with and lies adjacent to an upper curved edge of a portion of the cutter bar. This construction will be discussed in further detail below. The three centre plate rivets 30 are spatially distributed so that they spread stresses evenly throughout the centre plate 26 and the side plate 16.

Figure 4:
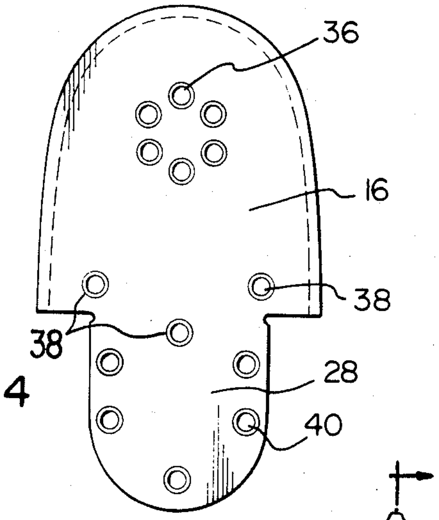
FIG. 4 illustrates a front elevation view of the new face plate design with rivet holes.

FIG. 4 illustrates a front elevation view of the side plate 16 with spaced rivet holes punched, drilled or bored therein. The side plate 16 is shaped to have a curved nose covering the sprocket, except for protruding sprocket teeth, and a curved connector extension 28 on one side thereof opposite the curved nose of the side plate 16. As seen in FIG. 4, the side plate 16 has punched, bored or drilled therein a circular array of sprocket rivet holes 36. Three spatially arranged centre plate rivet holes 38 are punched, drilled or bored in the central area of the side plate 16. A spatially arranged group of five extension rivet holes 40 is punched, drilled or bored in the connector extension 28.

FIG. 5 illustrates a front elevation view of the centre plate 26. Three centre plate rivet holes 38 are punched, drilled or bored in the centre plate 26. The position of these rivet holes 38 corresponds with the three rivet holes 38 in the side plate 16, as discussed previously in relation to FIG. 4. As can be seen in FIG. 5, the bottom or lower edge 54 of the centre plate 26 is convex curved in a semi-circular pattern.

Figure 6:
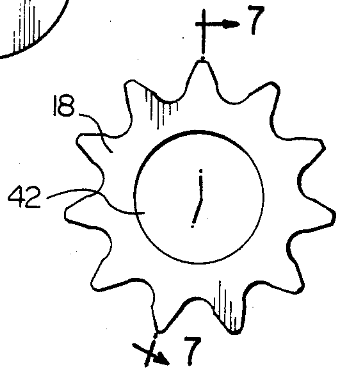
FIG. 6 illustrates a front elevation view of the sprocket with bearing centre hole.
Figure 7:
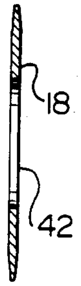
FIG. 7 illustrates a side section view of the sprocket taken along section line A—A of FIG. 6.
Figure 8:
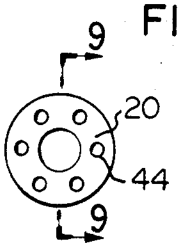
FIG. 8 illustrates a front elevation view of the bearing centre.
Figure 9:
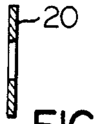
FIG. 9 illustrates a side section view of the bearing centre taken along section line 9—9 of FIG. 8.

FIGS. 6 and 7 illustrate front elevation and side section views of the sprocket 18, with bearing centre hole 42. The design of the sprocket 18 and bearing centre hole 42 is basically the same as the design of the sprocket illustrated in the original Scott-Jackson design disclosed and claimed in U.S. Pat. No. 3,762,047. FIGS. 8 and 9 illustrate in front elevation and side section views respectively the construction of the bearing centre 20. The bearing centre 20 has punched, bored or drilled therein a circular arrangement of six bearing centre rivet holes 44. The spacing and position of these rivet holes 44 corresponds with the corresponding rivet holes in side plate 16, as discussed previously in association with FIG. 4.

Figure 10:
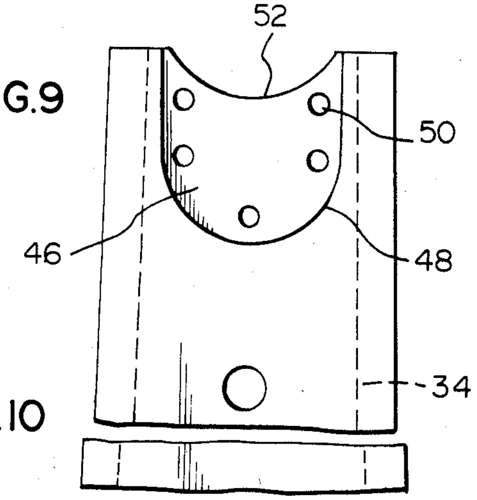
FIG. 10 illustrates a front elevation view of the cutter bar.

FIG. 10 illustrates in front elevation view the construction of the cutter bar 34. The cutter bar 34 has formed therein on each side at the forward end, a pair of connector extension receptacles 48, which are machined to be congruent with and fit snugly with the shape of the extensions of the respective pair of side plate connector extensions 28, illustrated in FIG. 4. The matching receptacles 48 machined in the forward end of the bar are not cut completely through the thickness of the bar. Thus a web 46 of thickness equal to that of centre plate 26, remains in the mid-section of the cutter bar 34, when the pair of receptacles 48 are milled from each side of the cutter bar 34. Punched, drilled or bored in spatial arrangement in the web 46 are five extension-web rivet holes 50 which correspond in size and location with the five extension rivet holes 40 which are machined in the respective pair of matching side plates 16. An important feature of the construction of the cutter bar 34, as illustrated in FIG. 10, is the curved center plate facing edge 52, shown at the top side of the cutter bar 34. The radius of the facing edge 52 has the same pivot point as the radius of curvature of the curved web facing edge 54 (see FIG. 5).

The radius of curvature selected for the curved centre plate facing edge 52 on cutter bar 34, and the curved web facing edge 54 on the centre plate 26, is important to the proper functioning of the invention. As can be seen in FIG. 3, when the cutter bar-nose combination is assembled, curved edge 52 and curved edge 54 respectively are spaced slightly apart. The purpose of the matching curved edges 52 and 54 is to provide at this location within the interior of the cutter bar assembly a second calculated point of variation in strength.

As discussed in general terms initially, the curvatures of the facing edges 52 and 54 are carefully selected to strike a compromise balance between ensuring sufficient overall strength of the cutter bar assembly and providing a calculated location of strength variation which manifests itself if and when a strong distorting and potentially damaging binding or bending action is exerted on the cutter bar assembly. A curve of large radius (that is, a shallow curve of the corresponding facing edges 52 and 54) tends to cause the cutter bar assembly to be too weak. On the other hand, a curve of small radius (that is, a tight curve) tends to cause the calculated point of strength to be too strong. Hence the cutter bar assembly would be encouraged to bend at a location closer to the sprocket. This would nullify or offsets the advantage and effect of the second calculated point of strength.

A first calculated point of variation in strength is located at the curved sprocket facing edge 53, as described previously (see FIG. 5). A second point of variation in strength is located between edges 52 and 54. When an excessive bending force is applied to the bar-nose assembly, such as might occur in use in the field, the cutter bar-nose assembly bends permanently at the location between the facing edges 52 and 54. Since the second point of calculated strength variation is removed from the sprocket 18, permanent damage to the sprocket is avoided. The result is a segregated gradual bending profile rather than a sharp bend at a single location. This avoids or minimizes a pinching action taking place on the sprocket 18 when the cutter bar-nose assembly is bent in extreme. Any permanent bend which occurs at the second point of variation in strength can be easily rectified in any ordinary method used to straighten cutter bars.

The utilization of the spacer web 46 in the cutter bar 34 is also an important feature of the invention. The web 46 is advantageous in that it acts as a retaining means to prevent the extensions of the cutter bar 34 on either side of the web 46 to spread apart due to stress, as can occur when the cutter bar-nose assembly is subjected to prolonged heavy use or abuse. In the cutter bar-nose assembly disclosed and claimed in the original Scott-Jackson design, U.S. Pat. No. 3,762,047, no spacer web 46 is present. As a consequence, due to stress, it is possible for the extensions of the cutter bar on either side of the spacer 65 (see FIG. 2 of U.S. Pat. No. 3,762,042) to spread slightly when the cutter bar-nose assembly is subjected to rough handling, tough use or longstanding use. Indeed, in rare instances, one or more of the extensions may become permanently bent or even broken. In any event, when spreading of the extensions takes place, the chain saw guide bar must be replaced.

Figure 11:
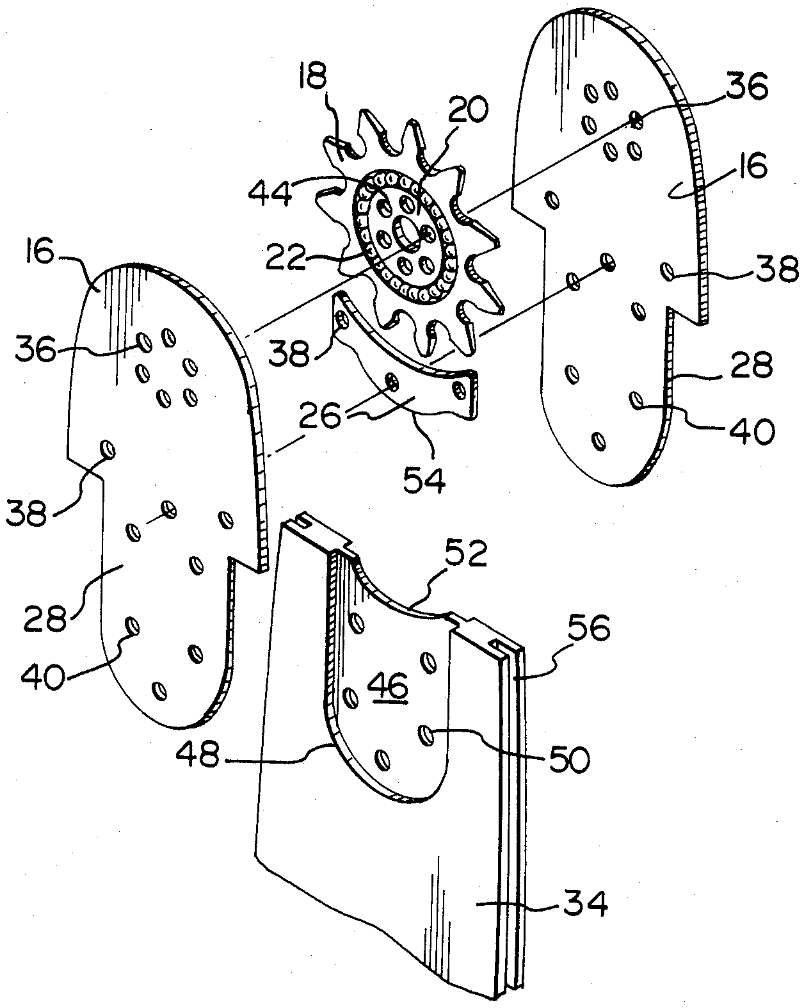
FIG. 11 illustrates an exploded perspective view of the components making up the bar nose-cutter bar assembly of the invention.

FIG. 11 illustrates in exploded perspective view, the components which make up the cutter bar-nose assembly. As can be seen in FIG. 11, a pair of matching side plates 16 cooperate to sandwich or laminate the sprocket 18, bearing centre 20 and bearing rollers 22 between them. Likewise, the centre plate 26 is sandwiched or laminated between the two matching side plates 16. The respective connector extensions 28 of each side plate 16 fit within the respective receptacles 48 machined in both sides of the cutter bar 34. The thicknesses of the bearing centre 20, centre plate 26, and spacer web 46 are basically equal to provide a close fitting strong construction. The thickness of the sprocket 18, however, is slightly less than the thickness of the bearing centre 20, to enable the sprocket 18 to rotate freely around the bearing centre 20 in combination with the bearing rollers 22 and free of the pair of side plates 16. Once the pair of side plates 16 are fitted together to enclose the sprocket 18, bearing centre 20, bearing rollers 22 and centre plate 26, and the respective connector extensions 28 of the pair of matching side plates 16 are positioned in the respective receptacles 48 on each face of the cutter bar 34. All components are then fastened and held together securely by means of rivets which extend through the various rivet holes 36, 38, 40 and 44 which have previously been punched, drilled or machined in the respective components.

The novel bar-nose assembly as described has a number of important manufacturing and cost advantages:

1. The bar with the solid web can be manufactured at significantly less cost than the original Scott-Jackson design disclosed in U.S. Pat. No. 3,762,047.

2. The curve at the edge of the web facing the nose at the forward end of the bar allows better dimensional control.

3. Less milling is involved with the new bar-nose design than with the original Scott-Jackson design.

4. Because there are fewer rivet openings, there are fewer holes to punch with attendant savings in cost of manufacture.

5. No grinding of inside edges, and the like, is required as in the case of the original Scott-Jackson design.

6. With the new bar-nose design, there is no danger of "off-centre" grinding of the arms forward bar extensions with resulting mismatch.

7. There is no need to grind the outside surfaces to correct for mismatch resulting from heat treatment distortion.

8. The new design can be constructed using less side plate material.

9. The new centreplate design uses significantly less material and is less costly to produce.

EXAMPLE

Pinch Test

A Pinch Test as described below and illustrated in FIG. 12 was conducted on the chain saw bar which is the subject of this patent application, the Scott-Jackson design discussed previously and several other bars available in the marketplace to determine the amount of force that is necessary to create restrictive sprocket nose rotation in such bars.

Figure 12:
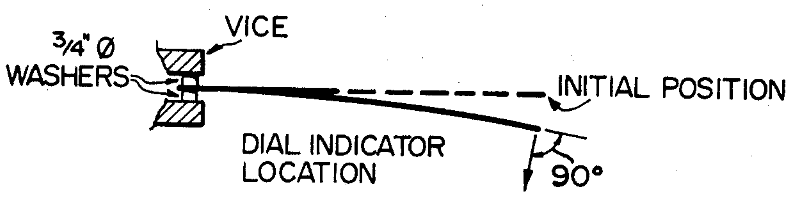
FIG. 12 illustrates a schematic view of equipment used to conduct a Pinch Test on a chain saw bar.

The replaceable sprocket nose in each case was held in a vice, as illustrated in FIG. 12 and a force was applied transversely at 24 inches from the clamping point. The sprocket nose was continually rotated as the force was steadily increased. When the nose rotation became restrictive, the amount of force was noted as well as the deflection of the bar at 1 inch from the clamping point. (Note: The clamping was conducted using $\frac{3}{4}''$ diameter washers over the nose bearing centers.)

Bend Test

Figure 13:
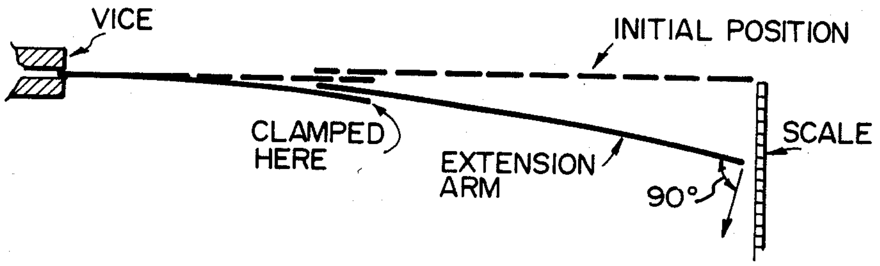
FIG. 13 illustrates a schematic view of equipment used to conduct a Bend Test on a chain saw bar.

A Bend Test as described below and illustrated in FIG. 13 was conducted on the chain saw bar which is the subject of this patent application, the Scott-Jackson design discussed previously and several other bars available in the marketplace to determine the plastic deformation of the replaceable sprocket noses on such bars.

The replaceable sprocket nose in each case was clamped in the same vice as the Pinch Test without the ¾" diameter washers as illustrated in FIG. 12. An extension was put on the bars so that the force being applied was four feet from the pivot point. A predetermined force was then applied and released. The amount of deformation from its initial position was recorded. This was carried out for each bar with a range of forces being applied.

Procedure and Results

Both the Pinch and Bend Tests were conducted to duplicate field problems. In the first test, the field problem is that a slight bending of the nose may cause interference in free rotation of the nose sprocket. This in turn causes the sprocket nose parts to heat up and fail prematurely.

The Bending Test was used to simulate a sprocket nose being pinched in a free cut (kerf) and as a result the operator then uses a bending force in an attempt to free the saw. This action can cause severe bending stress on the pinched section of the bar and possible plastic deformation of the bar.

The results of the Pinch Test conducted on several commercially available chain saw bar-nose assemblies are tabulated below.

TABLE 1

| Bar | Total Force (Lbs.) | Deflection (Ins.) |
|---|---|---|
| New Scott-Jackson and Lim Design | 24 | .044 |
| Model A | 17 | .037 |
| Model B | 14.5 | .023 |
| Model C | 9.75 | .013 |
| Model D | 9 | .013 |
| Model E | 3.75 | .010 |

NOTE:
1. Distance from centre of sprocket to force = 24 inches.
2. Distance from centre of sprocket to dial indicator = 1.0 inches.

Figure 14:
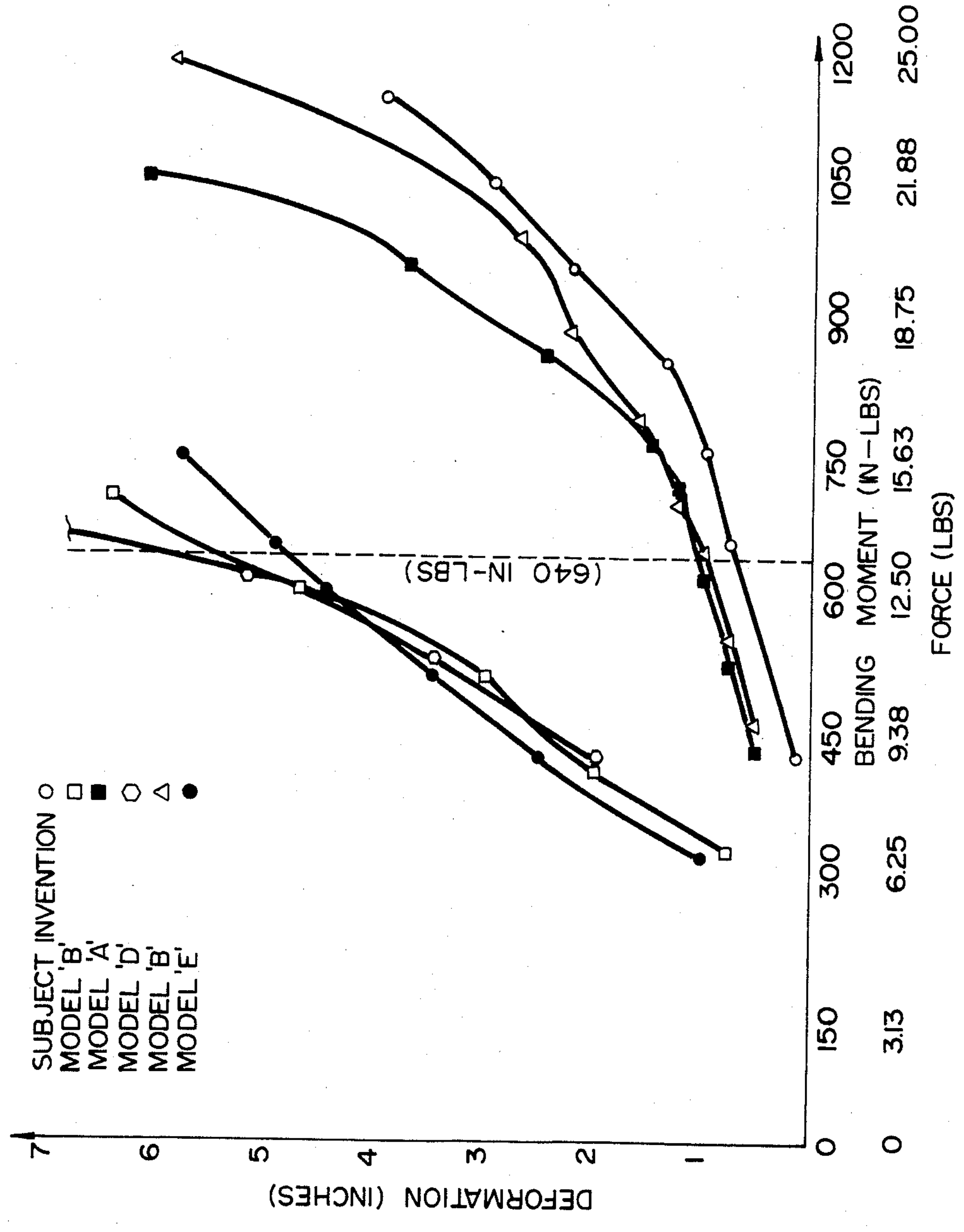
FIG. 14 illustrates graphical results of bending moment vs. deformation tests conducted on several chain saw bar designs.

The results of the Bend Test conducted on several commercially available chain saw bar-nose assemblies and the subject invention are illustrated in graphic form in FIG. 14. It is apparent that the chain saw bar-nose assembly was able to absorb the largest amount of bending moment with minimum deformation.

The Bend Test simulates a particular abuse condition in the field. A typical example would be a logger using a conventional chain saw with a 32 inch bar. While cutting, the nose becomes pinched and the logger cannot free it. The logger leaves the saw to get an axe. He leaves the saw hanging by the pinched nose. The saw and bar assembly, which normally weights about 20 pounds, would cause a moment on the bar of about 640 in./lbs. (This is taking for granted that the person lets the saw down gradually without allowing it to oscillate, which would aggravate the situation.) In this situation, according to the results described in FIG. 14, the bars identified as Models C, D and E would deform substantially causing permanent nose damage. On the other hand, the design of the instant invention would deform a minimal amount, thereby causing no serious nose damage. No bending back into shape is required.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

We claim:

1. A chain saw cutter bar-nose assembly comprising, in combination, a cutter bar having oppositely disposed side edge portions each having an outer side edge for slidably accommodating the travel of a saw chain thereon and an outer end, the bar having a pair of overlying, oppositely disposed recesses each on one side of the bar opening into the bar outer end and defining an integral web, the web extending transversely between the cutter bar side edge portions and terminating in a concave outer edge adjacent the bar outer end;

a nose assembly including a pair of substantially identical side plates each having an extension receivable within a respective one of the recesses to position the side plates in vertically aligned, spaced-apart relationship to define a clearance space therebetween;

means for securing the extensions in the recesses to the web;

a saw chain sprocket rotatably mounted between the side plates within the clearance space adjacent the outer end of the side plates; and a transversely extending center plate disposed within the clearance space between the web outer edge and the peripheral edge of the sprocket, the center plate having a convex edge adjacent the web disposed in nesting relationship with the web concave outer edge, the structure of the center plate and the web, in combination with the side plates providing a correctable point of calculated weakness to protect the sprocket from damage; and means for securing the center plate to the side plates.

2. A saw bar nose assembly as defined in claim 1 wherein the point of weakness is caused by a space between the centre plate and the web.

3. A saw bar nose assembly as defined in claim 1 wherein a second point of calculated weakness is constructed in the interior of the bar between the centre plate and the sprocket.

4. A saw bar nose assembly as defined in claim 2 wherein a second point of calculated weakness is constructed in the interior of the bar between the plate and the sprocket.

5. A saw bar nose assembly as defined in claim 1 wherein the plate is curved in a concave manner on the side adjacent to the sprocket to accomodate the circular edge of the sprocket.

6. A saw bar nose assembly as defined in claim 2 wherein the plate is curved in a concave manner on the side adjacent to the sprocket to accomodate the circular edge of the sprocket.

7. A saw cutter bar nose assembly as defined in claim 1 wherein the cutter bar and the nose assembly are detachable from one another.

* * * * *